(12) United States Patent  
Weingartz et al.

(10) Patent No.: US 9,404,572 B1  
(45) Date of Patent: Aug. 2, 2016

(54) SYNCHRONIZER FORK POSITION CONTROL

(71) Applicant: GM GLOBAL TECHNOLOGY OPERATIONS LLC, Detroit, MI (US)

(72) Inventors: Christopher Jay Weingartz, Fenton, MI (US); Colin Hultengren, New Hudson, MI (US); Glenn W. Hoefflin, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/638,496

(22) Filed: Mar. 4, 2015

(51) Int. Cl.
| | |
|---|---|
| *G06F 17/00* | (2006.01) |
| *F16H 61/04* | (2006.01) |
| *F16H 61/688* | (2006.01) |
| *F16H 3/00* | (2006.01) |

(52) U.S. Cl.
CPC ............ *F16H 61/0403* (2013.01); *F16H 3/006* (2013.01); *F16H 61/688* (2013.01); *F16H 2306/48* (2013.01)

(58) Field of Classification Search
None
See application file for complete search history.

(56) References Cited

U.S. PATENT DOCUMENTS

| | | | | |
|---|---|---|---|---|
| 8,140,231 | B2* | 3/2012 | Futamura | F16H 61/0021 477/154 |
| 8,793,057 | B2* | 7/2014 | McDonnell | B60W 10/02 701/54 |
| 9,057,434 | B2* | 6/2015 | Tao | F16H 61/688 |
| 9,273,778 | B2* | 3/2016 | Weingartz | F16H 59/38 |
| 2015/0300485 | A1* | 10/2015 | Weingartz | F16H 61/2807 74/335 |
| 2015/0369364 | A1* | 12/2015 | Vu | F16H 61/688 701/53 |
| 2016/0069453 | A1* | 3/2016 | Atmaram | F16H 59/46 192/3.61 |

* cited by examiner

*Primary Examiner* — Dirk Wright  
(74) *Attorney, Agent, or Firm* — Quinn Law Group, PLLC

(57) ABSTRACT

A vehicle includes an engine, a transmission having a position-controlled clutch with a synchronizer sleeve and a synchronizer fork, an input member with an input speed, and an output member with an output speed, and a controller. The controller is programmed to register a slip-away condition when the input speed falls within a calibrated speed band and the output speed remains below a calibrated threshold speed. In response to the registered slip-away condition, the controller records a diagnostic code indicative of the synchronizer sleeve being disengaged, changes an engaged position of the synchronizer sleeve by a calibrated amount to thereby adapt the engaged position, and commands the clutch to disengage and the fork to move to a neutral position after increasing the engaged position. The controller also moves the synchronizer sleeve toward the adapted engaged position and applies the clutch when the synchronizer sleeve attains the adapted engaged position.

18 Claims, 2 Drawing Sheets

SYNCHRONIZER FORK POSITION CONTROL

TECHNICAL FIELD

The present disclosure relates to the position control of a synchronizer fork.

BACKGROUND

In automotive transmissions using position-controlled input clutches, such as a dual clutch transmission (DCT) or an automated manual transmission (AMT), synchronizers are used to engage drive gears so as to achieve a desired gear ratio. A synchronizer typically includes a hub that is fixedly mounted to a shaft of the transmission, as well as a sleeve that is engaged with the hub. During a synchronization event prior to engagement of an input clutch, the sleeve is moved via translation of a corresponding shift fork. Axial movement of the fork urges the sleeve along a shaft axis, across a blocker ring, and into interlocking engagement with a particular drive gear, with the drive gear depending on the particular shift maneuver being commanded. The timing, position, and movement of the various forks and synchronizers in a transmission are precisely controlled in order to obtain consistently smooth gear shifts.

In a DCT in particular, a first input clutch is applied to engage oddly-numbered gears of a gearbox, i.e., $1^{st}$, $3^{rd}$, $5^{th}$, and $7^{th}$ gear, while a second input clutch is applied to engage the evenly-numbered gears such as $2^{nd}$, $4^{th}$, $6^{th}$, and reverse gear. Different forks are used to move synchronizer sleeves for each of these gears. A transmission control module (TCM) typically predicts the next-selected or desired gear using various available control inputs such as engine acceleration and braking levels. The TCM then commands engagement of a particular synchronizer and fork ahead of engagement of the input clutch needed for establishing a driving connection between the engine and the selected drive gear. The unique structure of a DCT can provide faster shift speeds relative to a conventional automatic transmission, with improved overall shift control and increased power.

SUMMARY

A system is disclosed herein that includes a transmission having a position-controlled input clutch and a controller. The controller is programmed with logic embodying a method that detects a "slip-away" condition in a vehicle having the system, i.e., a condition in which a synchronizer sleeve for a designated gear of the transmission used to launch the vehicle reports that it is engaged, i.e., has achieved a calibrated and previously adjusted or adapted position hereinafter referred to as an "adapted engaged position", without actually having fully engaged the designated gear. The controller is also programmed to execute a control action in response to the detected slip-away condition.

Execution of the present method is intended to help solve a particular control problem that may result in a transmission in which an adaptive position learning process is used for a synchronizer fork. During such a process, a calibrated engaged position of the synchronizer sleeve is updated over time in logic of the controller, i.e., adapted. As is known in the art, torque is unable to be transmitted to a gear when the sleeve used to engage the gear is blocked. Any attempt to apply an input clutch with a blocked sleeve can result in a loss of torque. With the synchronizer not fully engaged, torque will not be transferred across the input clutch. The present method is intended to provide a way for the controller to detect and resolve a possible root cause of a vehicle's failure to launch or creep without assuming that the cause of this condition is a slipping input clutch in the conventional manner.

In a particular embodiment, the controller determines input and output speeds of the transmission, e.g., via transmission input and output speed sensors. The input speed is compared to a first calibrated threshold speed that is set in logic with respect to engine speed. If the input speed exceeds the first calibrated speed threshold, and therefore falls within a predetermined range of engine speed, and the output speed remains below a second calibrated threshold speed, the controller indicates a slip-away condition in logic. That is, if the synchronizer were in fact engaged, the vehicle would begin to accelerate, and therefore the logical comparison conducted by the controller is used to detect a lack of the expected acceleration.

As a result of this particular indication, the controller changes the adapted engaged position for the synchronizer in logic of the controller. This adjustment in turn results in the synchronizer's position being reported as "not engaged". The input clutch is thereafter commanded to disengage. The fork for the synchronizer sleeve is next commanded to re-engage to the new adapted position. If the new adapted position is successfully attained, the input clutch is automatically applied and the vehicle is launched or allowed to creep. Otherwise, the process repeats.

A transmission is also disclosed for a vehicle having an engine. The transmission includes a position-controlled clutch, a gear element, a synchronizer sleeve that is engageable with the gear element, a synchronizer fork engaged with the synchronizer sleeve, an input member having an input speed, an output member having an output speed, and a controller programmed as set forth above.

Additionally, a method for controlling a position of a synchronizer fork in a vehicle having an engine and a transmission includes detecting a slip-away condition via a controller when an input speed of the transmission is less than a first calibrated threshold speed, i.e., within a calibrated range of engine speed, and an output speed of the transmission is below a second calibrated threshold speed. In response to the detected slip-away condition the method includes recording a diagnostic code indicative of the synchronizer sleeve being disengaged from the gear element, increasing an engaged position of the synchronizer sleeve by a calibrated distance to thereby adapt the engaged position, and commanding the clutch to disengage and the fork to move to a neutral position, via the controller, after adapting the engaged position. The method further includes moving the synchronizer sleeve toward the adapted engaged position and applying the clutch when the synchronizer sleeve attains the adapted engaged position.

The above and other features and advantages of the present disclosure are readily apparent from the following detailed description of some of the best modes and other particular embodiments for carrying out the disclosure, as set forth in the appended claims, and when considered in connection with the accompanying drawings.

DETAILED DESCRIPTION

Figure 1:
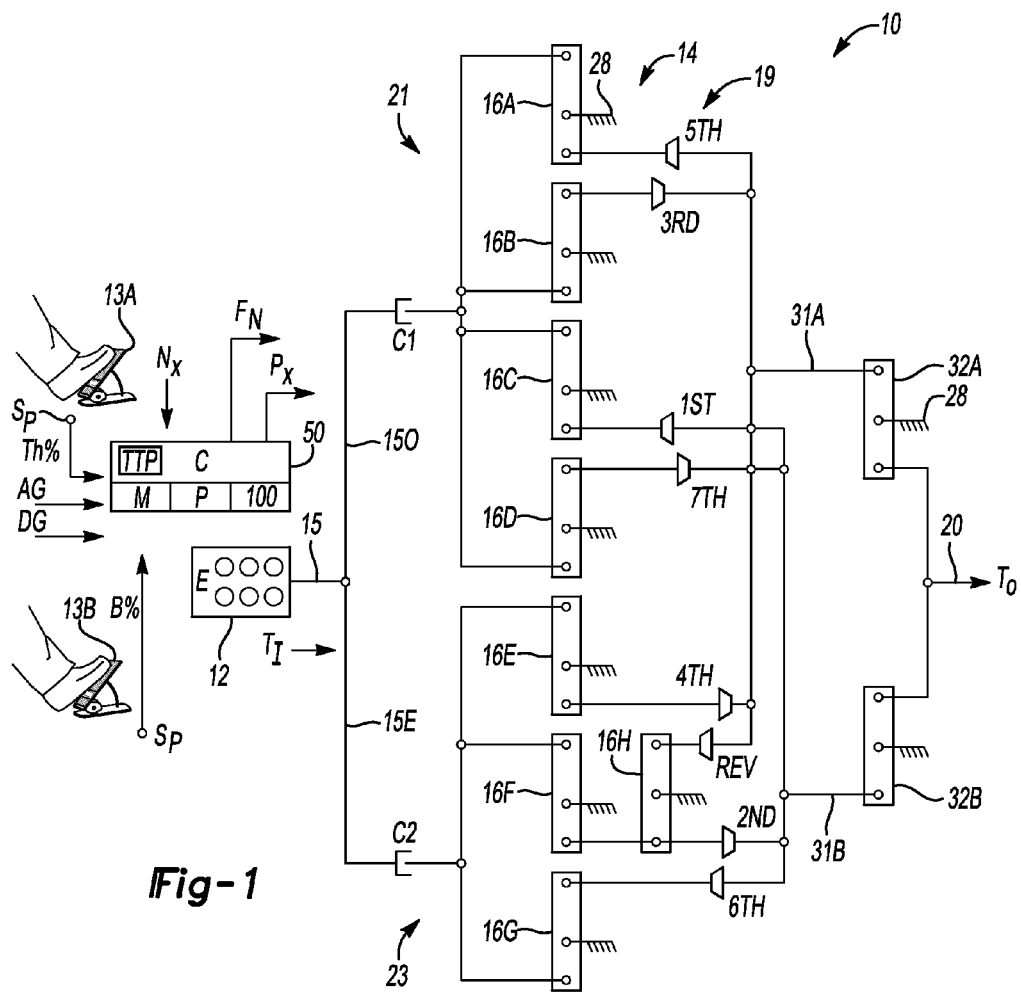
FIG. 1 is a schematic illustration of a vehicle having a position-controlled clutch in the form of an example dual-clutch transmission (DCT) and a controller programmed to control the engaged position of a synchronizer fork as set forth herein.
Figure 4:
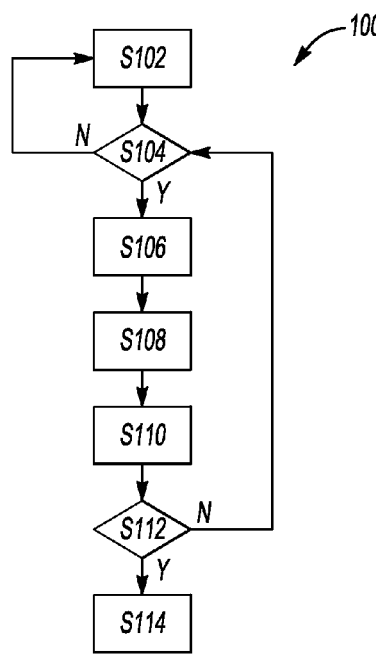
FIG. 4 is a flow chart describing a method of controlling the engaged position of the low synchronizer fork.

Referring to the drawings, wherein like reference numbers refer to like components throughout the several Figures, an example vehicle 10 is shown schematically in FIG. 1. The vehicle 10 includes an internal combustion engine (E) 12 and a transmission 14, the latter of which is shown in FIG. 1 as a non-limiting example dual-clutch transmission (DCT). A controller (C) 50 is programmed to execute a method 100, an example embodiment of which is shown in FIG. 4 and described below, in order to detect a slip-away condition. As used herein, the term "slip-away condition" refers to a condition in which a synchronizer sleeve of a designated gear used to launch the vehicle 10, e.g., $1^{st}$ or $2^{nd}$ gear, reports in logic that it is presently engaged without actually being fully engaged with its designated gear. In other words, an engaged position adapted value for a given synchronizer fork of the transmission 14 is too close to a neutral state to properly transfer torque.

Figure 3:
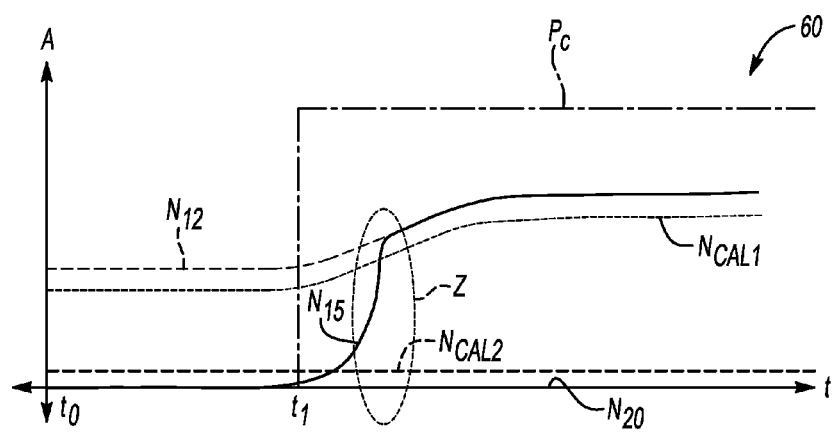
FIG. 3 is a plot of transmission output speed (x-axis) versus commanded clutch position (y-axis).

In response to such an event, the controller 50 executes a control action to correct this condition. The method 100 may be executed in any transmission 14 having a position-controlled clutch, such as but not limited to the example DCT design shown in FIG. 1 and an automated-manual transmission. An example synchronizer sleeve, designated gear, and synchronizer fork are described below with reference to FIG. 2, while a set of entry conditions for the method 100 is depicted in FIG. 3.

As is well known in the art, before applying the input clutch synchronization is needed of the designated gear and the particular input shaft that is carrying input torque in the transmission 14. An engaged position of a synchronizer fork may be modified, adjusted, or otherwise adapted in logic over time during operation of the transmission 14 to determine when the synchronizer is fully engaged. This value, which is stored in memory (M) of the controller 50 and used in shift control operations, is adjusted over time to maintain accuracy. It is recognized herein that if the adapted position is incorrect, but still sufficiently close to neutral so that the synchronizer sleeve does not engage its designated gear, parking of the synchronizer at a previously-adapted engaged position may lead to the transmission 14 not transferring torque to the designated gear when it is expected to do so. This in turn can lead to various issues, including an inability to propel the vehicle 10. Therefore, the controller 50 of FIG. 1 is programmed to detect the slip-away condition and correct the adapted engaged position so as to maintain or restore torque transfer capability.

With respect to the structure of the example vehicle 10 of FIG. 1, the engine 12 is responsive to a received throttle level (arrow Th %) requested via a force applied to/or a corresponding percentage of travel of an accelerator pedal 13A. The throttle level (arrow Th %) requests a relative level of input torque (arrow Ti) from the engine 12. The force/travel of the accelerator pedal 13A may be measured via a force or position sensor ($S_P$) in the conventional manner. The engine 12 also responds to a braking level (arrow B %) from a brake pedal 13B, with the braking level (arrow B %) likewise detected via a force or position sensor ($S_P$). In response to receipt of the throttle level (arrow Th %) by the controller 50, the engine 12 delivers the input torque (arrow $T_I$) to the transmission 14 via an input shaft 15, or more precisely in a DCT embodiment, via one of two different input members 15E and 15O.

The example transmission 14 of FIG. 1 may include two independently-operated, non-lubricated respective first and second input clutches C1 and C2. While omitted from FIG. 1 for illustrative clarity, each input clutch C1 and C2 may include a center plate containing spaced friction discs, plates, or other suitable friction devices. The input clutches C1 and C2 are selectively compressed together via a fluid-actuated clutch piston or other suitable clutch actuator(s) (not shown), with these pistons having an axial position that is used in the overall control of the input clutches C1 and C2. Associated electronic and hydraulic clutch control devices (not shown) ultimately control the shift operations of the transmission 14, including change-of-mind shifts as noted above, in response to instructions or commands from the controller 50.

The first input clutch C1 may be used to connect the engine 12 to any of the oddly-numbered gear s 16A, 16B, 16C, and 16D, each having a node/gear element connected to a stationary member 28, for instance to establish respective fifth ($5^{th}$), third ($3^{rd}$), first ($1^{st}$), and seventh ($7^{th}$) gears in the example 7-speed design of FIG. 1. The second input clutch C2 connects the engine 12 to reverse or any of the respective evenly-numbered gear sets 16E, 16F, and 16G, e.g., fourth ($4^{th}$), second ($2^{nd}$), and sixth ($6^{th}$) gears in the same example 7-speed transmission, as well as a reverse (REV) gear set 16H. Clutch fork and synchronizer pairs 19 are shown schematically for the various gear sets. Using this type of gear arrangement, the transmission 14 can be rapidly shifted through its available range of gears without completely interrupting the power flow from the engine 12.

In the example vehicle 10 of FIG. 1, the transmission 14 also includes an output member 20 that is connected to a set of drive wheels (not shown). The output member 20 ultimately transmits output torque (arrow $T_O$) from the transmission 14 to the drive wheels in order to propel the vehicle 10. The transmission 14 may include a first input shaft 21 that is connected to the output side of the first input clutch C1, and also a second input shaft 23 that is connected to the output side of the second input clutch C2. The first input shaft 21 is connected to only the oddly-numbered gear sets 16A, 16B, 16C, and 16D. Likewise, the second input shaft 23 is connected to only the evenly-numbered gear sets 16E, 16F, and 16G and the reverse gear set 16H. The transmission 14 further includes upper and lower main shafts 31A and 31B, respectively, which may be connected to respective final drive gear sets 32A and 32B. The final drive gear sets 32A and 32B provide any required final gear reduction.

The controller 50 of FIG. 1 may be embodied as a microprocessor-based computing device or devices having a processor (P) and the memory (M), including but not necessarily limited to magnetic or optical read only memory (ROM), random access memory (RAM), electrically-erasable programmable read-only memory (EEPROM), flash memory, etc., and any required circuitry. The circuitry may include high-speed clocks, analog-to-digital (A/D) circuitry, digital-to-analog (D/A) circuitry, a digital signal processor, transceivers configured to transmit and receive any required signals during the overall control of the transmission 14, and the necessary input/output (I/O) devices and other signal conditioning and/or buffer circuitry.

The controller 50 determines or processes driver inputs such as throttle level (arrow Th %), braking level (arrow B %), vehicle speed (arrow $N_X$), the attained gear (arrow AG), i.e., the gear state the transmission 14 is currently in, and a desired gear (arrow DG) to be attained. The controller 50 ultimately outputs a clutch position control signal (arrow $P_X$) to the designated input clutch C1 or C2 for a given shift to set the position of the designated input clutch C1 or C2, and fork control signals (arrow $F_N$) to the corresponding clutch forks and synchronizer pair 19 needed for engaging the desired gear.

The clutch position control signal (arrow $P_X$) sets the axial or linear position of a clutch apply piston or other actuator device of the input clutch C1 or C2 for applying the input clutch C1 or C2, whichever one acts as the oncoming clutch during a requested shift. A torque-to-position (TTP) table may be recorded in memory (M) of the controller 50 and referenced to determine the required apply position for the input clutches C1 and C2, and the clutch forks and synchronizer pairs 19, as is well known in the art of position-controlled clutches.

Figure 2:
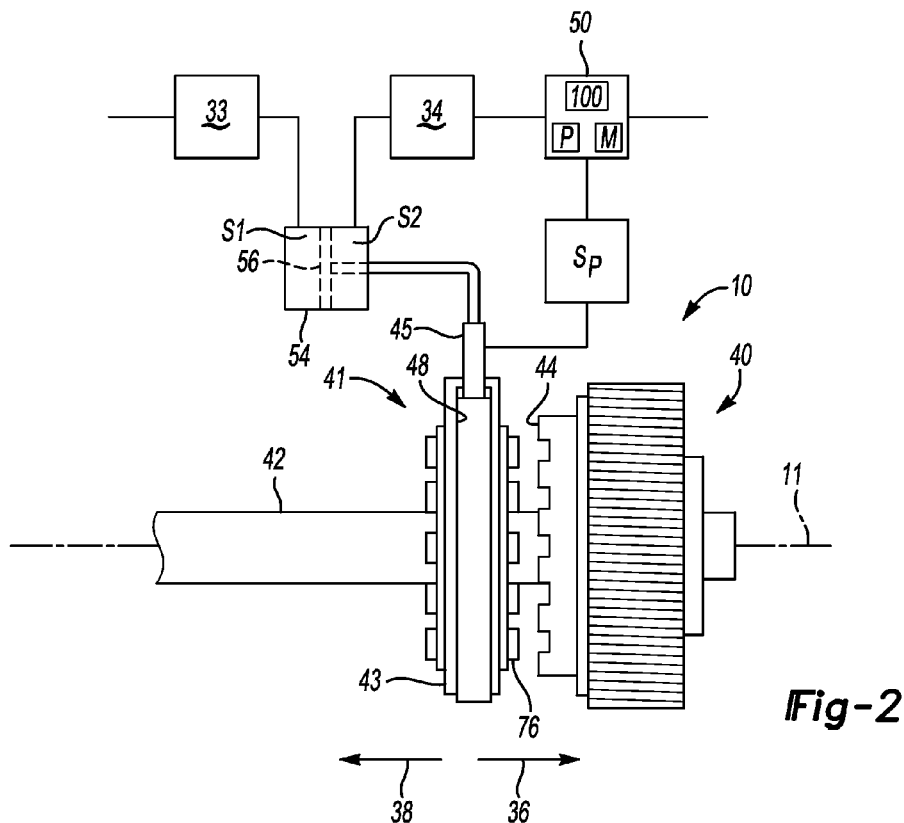
FIG. 2 is a schematic illustration of an example sleeve and gear of the transmission shown in FIG. 1.

Referring briefly to FIG. 2, a portion of the transmission 14 of FIG. 1 is shown in fragmentary view. The transmission 14 may include respective first and second solenoid valves 33 and 34 in communication with an actuator 54. For instance, a piston 56 may be applied and released via the valves 33, 34, or may be applied using one such valve and a return spring as is known in the art. The controller 50 is in communication with a position sensor ($S_P$) disposed proximate a fork 45 and operable to determine a position of the sleeve 43 for engaging a designated gear, e.g., one used to launch or creep the vehicle 10.

The transmission 14 may further include a shaft 42 and a plurality of gears, including a gear 40 needed for establishing a launch state of the vehicle 10. The shaft 42 is rotatable about a shaft axis 11. The transmission 14 includes at least one synchronizer 41 configured to rotatably couple the gear 40 to the shaft 42 upon which the gear 40 is supported so as to engage that particular gear 40. The synchronizer 41 includes a synchronizer sleeve 43 which is meshed or otherwise engaged with a synchronizer hub (not shown) such that the synchronizer sleeve 43 is movable via a fork 45 in an engagement/applied direction (arrow 36) toward the gear 40 to be engaged, as well as in a disengagement/released direction (arrow 38) to a disengaged position, e.g., a neutral or blocked position of the sleeve 43.

The fork 45 is operatively attached to the synchronizer sleeve 43 by any suitable means such that the fork 45 can exert an axial moving force on the sleeve 43, for example by movement of an actuator piston 56 of a synchronizer actuator generally indicated at 54. In the example embodiment shown in FIG. 2, the sleeve 43 defines a fork slot 48 configured to receive the fork 45 such that the fork 45 is operatively attached to the sleeve 43. The synchronizer sleeve 43 includes sleeve teeth 76 that are engageable with mating splines 44 of the hub so as to engage the gear 40, as is known in the art.

Referring to FIG. 3, a set of traces 60 depicts changing vehicle parameters that may be used as part of the present method 100, with amplitude (A) plotted on the vertical axis and time (t) plotted on the horizontal axis. Trace $P_C$ is the position commanded from the controller 50 of FIG. 1, i.e., a step command which changes the position of a given synchronizer and fork pair 19 at a particular rate. The speed of the engine 12 is indicated via trace $N_{12}$. Shaft speeds $N_{15}$ and $N_{20}$ represent the respective speeds of input shaft 15 and output shaft 20 shown in FIG. 1, and therefore $N_{15}$ and $N_{20}$ represent the respective input and output speeds of the transmission 14.

The controller 50 detects a slip-away condition by examining the position of the sleeve 43 used to engage the gear 40 for achieving launch or creep of the vehicle 10, and by determining that the sleeve 43, while still at an adapted engaged position, has not yet actually fully engaged the gear 40. As the input speed (trace $N_{15}$) approaches a calibrated detection zone (Z), the controller 50 determines if the input speed (trace $N_{15}$) exceeds a first calibrated threshold speed ($N_{CAL1}$) while the output speed ($N_{20}$) remains below a second calibrated threshold speed ($N_{CAL2}$). If this condition occurs, the controller 50 indicates in logic that the slip-away condition is active. An engaged position, previously stored in memory (M), is then changed by a calibrated amount to thereby adapt the engaged position.

This action causes the synchronizer sleeve 43 to report its position via the position sensor $S_P$ as not being engaged. Sequencing control via the controller 50 thereafter commands a disengagement of the fork and synchronizer pair 19 and a disengagement of the input clutch C1 or C2, followed by an attempt to re-engage the synchronizer sleeve 43 to the new adapted engaged position. If the new adapted engaged position is attained in the subsequent attempt, the input clutch C1 or C2 is applied, and the controller 50 thereafter attempts to launch or creep the vehicle 10. The iterative process repeats until torque is transferred to the gear 40, at which point the slip-away detection logic is disabled. An example application of the method 100 will now be described with reference to FIG. 4.

Referring to FIG. 4, in an example embodiment the method 100 begins with step S102, which includes measuring or otherwise determining the input and output speeds (traces $N_{12}$ and $N_{15}$) as depicted in FIG. 3. Step S102 may entail measuring the rotational speeds of the input member 15, i.e., 15E and 15O, and that of the output member 20 shown in FIG. 1 using transmission input and output speed sensors, as is well known in the art, or receiving reported values from dedicated engine control and transmission control modules. The method 100 proceeds to step S104 when the input and output speeds (traces $N_{12}$ and $N_{15}$) are known.

Step S104 entails comparing the input speed (trace $N_{15}$) to the first calibrated threshold speed (trace $N_{CAL1}$) of FIG. 3 to determine if the input speed (trace $N_{15}$) is within a calibrated range of engine speed (trace $N_{12}$). Step S104 also entails comparing the output speed (trace $N_{20}$) to the second calibrated threshold speed (trace $N_{CAL2}$) of FIG. 3 to determine if acceleration of the vehicle 10 has not commenced. In a non-limiting example embodiment, the first calibrated threshold speed (trace $N_{CAL1}$) may be within less than about 50 RPM of engine speed (trace $N_{12}$), while the second calibrated threshold speed (trace $N_{CAL2}$) may be less than about 100 RPM. The term "about" as used herein is intended to allow for some slight amount of imprecision, i.e., reasonably close to the value or nearly, or variations which may arise from ordinary methods of measuring and using such parameters. In practice, the actual values used for the first and second calibrated threshold speeds (traces $N_{CAL1}$, $N_{CAL2}$) will depend on the gear ratio for the gear in question and the final drive. The method 100 proceeds to step S106 if both of these conditions are true. Otherwise, the method 100 repeats step S102.

At step S106, the controller 50 records a diagnostic code in memory (M) indicative of a detected slip-away condition. The method 100 then proceeds to step S108.

Step S108 includes adapting an engaged position value of the synchronizer 41 used for establishing the launch or creep state, e.g., $1^{st}$ or $2^{nd}$ gear. To accomplish the ends of step S108, the controller 50 of FIG. 1 may access a previously-recorded engaged position value in memory (M) and change or adjust this value by a calibrated incremental amount, e.g., a calibrated distance of travel. To avoid over-adjusting with each iteration, the calibrated distance should be minimal, e.g., 1-2 mm per adjustment or some other suitable value. The new adapted position value is recorded in memory (M), and the method 100 thereafter proceeds to step S110.

At step S110, the controller 50 next executes a control action with respect to the transmission 14. Step S110 may include reporting the synchronizer sleeve 43 as not being engaged, e.g., via a controller area network (CAN) message to a transmission control module or, in a simplified unitary controller option, recording this state in memory (M). Step S110 also includes commanding the input clutch C1 or C2 to disengage and the fork 45 to neutralize, then attempting to re-engage the synchronizer sleeve 43 to the newly adapted engaged position value from step S108. The method 100 then proceeds to step S112.

At step S112, the controller 50 determines if the newly adapted engaged position was achieved at step S110. The method 100 returns to step S104 if the newly adapted engaged position was not achieved. The controller 50 proceeds to step S114 in the alternative if the newly adapted engaged position was achieved.

Step S114 entails applying the input clutch C1 or C2 and launching or creeping the vehicle 10 in the designated gear, e.g., $1^{st}$ or $2^{nd}$ gear, using the newly adapted engaged position value.

Using the method 100 as described above, the controller 50 of FIG. 1 can avoid the problem of erroneously reporting an engaged position of a synchronizer sleeve prior to adapting the engaged position. The method 100 helps eliminate possible conditions such as the non-availability of propulsion due to a low engaged position adapted value. A means of recovery or correction is thus provided when a controller initially learns a blocked position as an engaged position, which can occur approximately 5% of the time in manual-based transmission designs such as those described hereinabove.

The detailed description and the drawings or figures are supportive and descriptive of the disclosure, but the scope of the disclosure is defined solely by the claims. While the best mode, if known, and other embodiments for carrying out the disclosure have been described in detail, various alternative designs and embodiments exist.

The invention claimed is:

1. A vehicle comprising:
an engine;
a transmission connected to the engine, wherein the transmission includes a position-controlled clutch, a gear element, a synchronizer sleeve that is engageable with the gear element, a synchronizer fork engaged with the synchronizer sleeve, an input member having an input speed, and an output member having an output speed; and
a controller having a processor and memory, wherein the controller is programmed to detect a slip-away condition when the input speed is less than a first calibrated threshold speed that is below engine speed and the output speed is below a second calibrated threshold speed that is indicative of the vehicle not accelerating, and in response to the detected slip-away condition to:
record a diagnostic code indicative of the synchronizer sleeve being disengaged from the gear element;
changing an engaged position of the synchronizer sleeve by a calibrated distance to thereby adapt the engaged position;
command the clutch to disengage and the fork to move to a neutral position after adapting the engaged position;
move the synchronizer sleeve toward the adapted engaged position; and
apply the clutch when the synchronizer sleeve attains the adapted engaged position.

2. The vehicle of claim 1, wherein the clutch is an input clutch connecting the transmission to the engine.

3. The vehicle of claim 2, wherein the controller is programmed to request a launch of the vehicle after applying the input clutch.

4. The vehicle of claim 2, wherein the controller is programmed to creep the vehicle after applying the clutch.

5. The vehicle of claim 1, wherein the transmission is a dual-clutch transmission having a pair of the input clutches.

6. The vehicle of claim 1, wherein the first calibrated threshold speed is within less than 50 revolutions per minute (RPM) of engine speed and the second calibrated threshold speed is less than 100 RPM.

7. A transmission for a vehicle having an engine with an engine speed, the transmission comprising:
a position-controlled clutch;
a gear element;
a synchronizer sleeve that is engageable with the gear element;
a synchronizer fork engaged with the synchronizer sleeve, an input member having an input speed, and an output member having an output speed; and
a controller having a processor and memory, wherein the controller is programmed to detect a slip-away condition when the input speed is less than a first calibrated threshold speed below the engine speed and the output speed is below a second calibrated threshold speed indicative of the vehicle not accelerating, and in response to the detected slip-away condition to:
record a diagnostic code indicative of the synchronizer sleeve being disengaged from the gear element;
change an engaged position of the synchronizer sleeve by a calibrated distance to thereby adapt the engaged position;
command the clutch to disengage and the fork to move to a neutral position after adapting the engaged position;
move the synchronizer sleeve toward the adapted engaged position; and
apply the clutch when the synchronizer sleeve attains the adapted engaged position.

8. The transmission of claim 7, wherein the clutch is an input clutch connecting the transmission to the engine.

9. The transmission of claim 8, wherein the controller is programmed to request a launch of the vehicle after applying the input clutch.

10. The transmission of claim 8, wherein the controller is programmed to creep the vehicle after applying the clutch.

11. The transmission of claim 7, wherein the transmission is a dual-clutch transmission having a pair of the input clutches.

12. The transmission of claim 7, wherein the first calibrated threshold speed is within less than 50 revolutions per minute (RPM) of engine speed and the second calibrated threshold speed is less than 100 RPM.

13. A method for controlling a position of a synchronizer fork in a vehicle having a transmission and an engine with an engine speed, wherein the transmission includes a position-controlled clutch, a synchronizer sleeve, a synchronizer fork, and a gear element, the method comprising:
detecting a slip-away condition via a controller when an input speed of the transmission is less than a first calibrated threshold speed below the engine speed and an output speed of the transmission is below a second calibrated threshold speed indicative of the vehicle not accelerating; and
in response to the detected slip-away condition:

recording a diagnostic code indicative of the synchronizer sleeve being disengaged from the gear element;

changing an engaged position of the synchronizer sleeve by a calibrated distance to thereby adapt the engaged position;

commanding the clutch to disengage and the fork to move to a neutral position, via the controller, after adapting the engaged position;

moving the synchronizer sleeve toward the adapted engaged position; and applying the clutch when the synchronizer sleeve attains the adapted engaged position.

14. The method of claim 13, wherein the clutch is an input clutch connecting the transmission to the engine.

15. The method of claim 14, further comprising requesting a launch of the vehicle via the controller after applying the input clutch.

16. The method of claim 14, further comprising requesting a creeping of the vehicle after applying the input clutch.

17. The method of claim 13, wherein the transmission is a dual-clutch transmission having a pair of the input clutches.

18. The method of claim 13, wherein the first calibrated threshold speed is within less than 50 revolutions per minute (RPM) of engine speed and the second calibrated threshold speed is less than 100 RPM.

* * * * *